United States Patent [19]

Bauch et al.

[11] Patent Number: 5,052,866

[45] Date of Patent: Oct. 1, 1991

[54] ACTUATING ARRANGEMENT FOR A CLAMPING DEVICE IN A MACHINE TOOL SPINDLE

[75] Inventors: Karl Bauch; Franz Ziegeltrum, both of Kempten; Helmut Heel, Lengenwang, all of Fed. Rep. of Germany

[73] Assignee: Ott Maschinentechnik GmbH, Kempten, Fed. Rep. of Germany

[21] Appl. No.: 571,315

[22] Filed: Aug. 22, 1990

[30] Foreign Application Priority Data

Oct. 30, 1989 [DE] Fed. Rep. of Germany ....... 3936122

[51] Int. Cl.⁵ ......................... B23C 5/26; B23B 31/10
[52] U.S. Cl. ................................ 409/233; 408/239 R
[58] Field of Search ........................ 409/231, 233, 232; 408/239 A, 239 R; 279/4

[56] References Cited

U.S. PATENT DOCUMENTS

| | | | |
|---|---|---|---|
| 4,068,559 | 1/1978 | Schmid, Jr. et al. | 409/233 |
| 4,290,720 | 9/1981 | Ferreira | 409/233 |
| 4,347,753 | 9/1982 | Claussen et al. | 409/233 X |
| 4,411,568 | 10/1983 | Röhm | 409/233 |

FOREIGN PATENT DOCUMENTS

| | | | |
|---|---|---|---|
| 3801509 | 7/1989 | Fed. Rep. of Germany | 409/233 |
| 244436 | 10/1986 | Japan | 409/233 |
| 584981 | 12/1977 | U.S.S.R. | 409/233 |

Primary Examiner—William Briggs
Attorney, Agent, or Firm—Flynn, Thiel, Boutell, & Tanis

[57] ABSTRACT

An actuating arrangement for a tool clamping device (1) has a clamping bar (3) which is axially displaceable in a clamping direction in a machine tool spindle (2) under the effect of a spring arrangement (11), and a wedge transmission assembly (9) which is operable between the spindle and the clamping bar, with freely movable balls which bear respectively against three cone surfaces of which the first is provided on a clamping sleeve (10) which is axially displaceable in the clamping direction on the clamping bar under the force of the spring arrangement (11), the second is provided on a clamping ring (12) connected to the clamping bar (3) and the third is provided on a support ring (13) which is arrangd stationarily with respect to the spindle. Provided on the support ring is a fourth cone surface (18) which is inclined relative to the axis of the clamping bar in opposite relationship to the third cone surface. A piston-cylinder unit (7, 8) is releasably connected to a release ring (20) provided in the region of the balls (14), by way of a locking means which acts in dependence on travel movement.

17 Claims, 7 Drawing Sheets

ACTUATING ARRANGEMENT FOR A CLAMPING DEVICE IN A MACHINE TOOL SPINDLE

FIELD OF THE INVENTION

The invention relates to an actuating arrangement for a tool or workpiece clamping device in a machine tool spindle, comprising a clamping bar which is axially displaceable in the clamping direction in the spindle under the force of a spring arrangement, and a wedge transmission assembly which is operative between the spindle and the clamping bar, with freely movable balls which respectively bear against three cone surfaces of which the first cone surface is provided on a clamping sleeve which is axially displaceable in the clamping direction on the clamping bar under the force of the spring arrangement, the second cone surface is provided on a clamping ring connected to the clamping bar and the third cone surface is provided on a support ring arranged stationarily with respect to the spindle, wherein the second and third cone surfaces are inclined relative to each other in such a way that, upon movement of the clamping bar in opposition to the clamping direction, self-locking occurs between said cone surfaces and the balls disposed therebetween, and further comprising a piston-cylinder unit whose piston firstly acts on the clamping sleeve in a first phase of its release stroke movement directed oppositely to the clamping direction, and also acts on an annular shoulder on the clamping bar in a second phase.

BACKGROUND OF THE INVENTION

In a known actuating arrangement of that kind (see the prospectus from the company A. Ott, Kempten, "Mit Prazision zum Erfolg, Ott-Werkzeugspanner", 1986 edition, page 3) the wedge transmission assembly serves in the clamping operation to increase the force which acts on the clamping bar from the spring arrangement in order thereby to enhance the pulling-in force (clamping force) of the tool or workpiece clamping device. In addition the wedge transmission assembly also serves to lock the clamping bar relative to the spindle in the clamped condition, so that in the event of failure of the spring arrangement, for example due to the spring breaking, or in the event of elevated pulling-out forces acting on the tool or the workpiece in opposite relationship to the clamping direction, the component which is clamped by the clamping device is securely held in position. In that known actuating arrangement the piston-cylinder unit serves not only for stressing the spring arrangement and for releasing the collet disposed at the front end of the clamping bar, but also for ejection of the tool from the spindle. As a large part of the force applied by the piston-cylinder unit is used for stressing the spring arrangement, only a part of that force is available for ejection of the tool. In the case of tools with a steep-angle taper, there is now the problem that, at high spindle speeds of rotation, the receiving cone or taper portion of the spindle expands and the tool is drawn further into the receiving cone or taper portion, under the effect of the spring arrangement. Therefore the tool ejection operation involves overcoming a shrink-type fit. In addition at high spindle speeds of rotation the balls are urged under the effect of centrifugal force into the wedge-shaped annular gap between the cone surfaces of the support ring and the clamping ring, whereby the clamping force is unintentionally increased. A higher ejection force is then also required to eject the tool. In order to produce that high ejection force, the arrangement requires a piston-cylinder unit which is of correspondingly large dimensions and/or a high operating pressure for that purpose. If there is a wish to increase the clamping force, that is possible only by increasing the size of the spring arrangement, and that in turn also requires an increase in the size of the piston-cylinder unit and/or an increase in the operating pressure. In order to produce a sufficient clamping stroke movement of the clamping bar in the clamping operation, a spring arrangement of comparatively great structural length is also required. Furthermore in the known clamping device the clamping stroke movement is restricted by the diameter of the balls as the clamping ring bears against the support ring at the end of the release stroke movement. The clamping stroke movement is always somewhat smaller than the ball diameter. The latter cannot be of just any desired size as with an increasing ball diameter on the one hand the structural size of the assembly increases while on the other hand the unintentional increase in the clamping force, which is caused by the effect of centrifugal force, is also increased.

Therefore the invention is based on the problem of providing an actuating arrangement for a tool or workpiece clamping device in a machine tool spindle of the kind set forth in the opening part of this specification, which, while being of reduced structural length for the spring arrangement, has an elevated ejection force, in which there is no unintentional increase in the clamping force due to the effect of centrifugal force, and the clamping stroke movement of which is independent of the ball diameter.

SUMMARY OF THE INVENTION

In accordance with the invention that is achieved in that provided on the support ring in a region thereof which is between the third cone surface and the spring arrangement is a fourth cone surface which is inclined relative to the axis of the clamping bar in opposite relationship to the third cone surface and which expands in a conical configuration towards the spring arrangement so that at the beginning of the clamping stroke movement produced by the spring arrangement the balls bear against the fourth cone surface and act on the clamping ring to produce a travel step-up effect, in a second phase of the clamping stroke movement they bear against the third cone surface and act on the clamping ring in such a way as to produce a force-increasing effect, and in a last phase of the oppositely directed release stroke movement they again bear against the fourth cone surface and act on the clamping sleeve in the direction of the spring arrangement to produce a force-increasing effect, and that the piston of the piston-cylinder unit is releasably connected to a release ring which concentrically surrounds the clamping ring and which is provided in the region of the balls, by way of a locking means which acts in dependence on travel movement and which during a first phase of the release stroke movement of the piston axially locks same to the release ring in a thrust-resistant fashion and releases said locking action in dependence on travel movement just before the balls have reached the radially narrowest location of the third cone surface and at that time the piston or an extension thereof bears against the annular shoulder on the clamping bar.

In the new clamping arrangement, a travel step-up effect occurs at the beginning of the clamping stroke movement which is produced by the spring arrangement. That has the advantage that, in the first phase of pulling in the tool or workpiece, in which only very low forces are required, the desired pulling-in or clamping movement of the clamping bar is produced with a short spring travel. The shorter spring travel requires a shorter spring length and it is thus possible to reduce the axial length of the spring arrangement to half the axial length which is otherwise conventionally employed. As in the last phase of the oppositely directed release stroke movement, the balls again bear against the fourth cone surface and act on the clamping sleeve in the direction of the spring arrangement to produce a force-increasing effect, only a small part of the piston force is required for tensioning the spring arrangement in the last phase of the release stroke movement. More piston force remains available for ejection of the tool, by virtue of a smaller amount of force being required for prestressing the spring arrangement. Furthermore, the third cone surface of the new actuating arrangement can be inclined relative to the axis of the clamping bar at a comparatively small angle of inclination. The result of that is that centrifugal forces which act on the balls at high speeds of rotation produce only a low axial force on the clamping ring, which is immaterial in relation to the axial force generated by the spring arrangement and which for the major part is absorbed by friction. Consequently there is also no unintentional increase in the clamping force. Furthermore the clamping stroke movement of the clamping bar is independent of the diameter of the balls as the outside diameter of the clamping ring can be smaller than the inside diameter of the support ring at the narrowest location thereof. Consequently the stroke movement of the clamping bar is not restricted.

BRIEF DESCRIPTION OF THE DRAWINGS

The invention is described in greater detail hereinafter with reference to a number of embodiments illustrated in the drawings in which.

DETAILED DESCRIPTION

Figure 1:
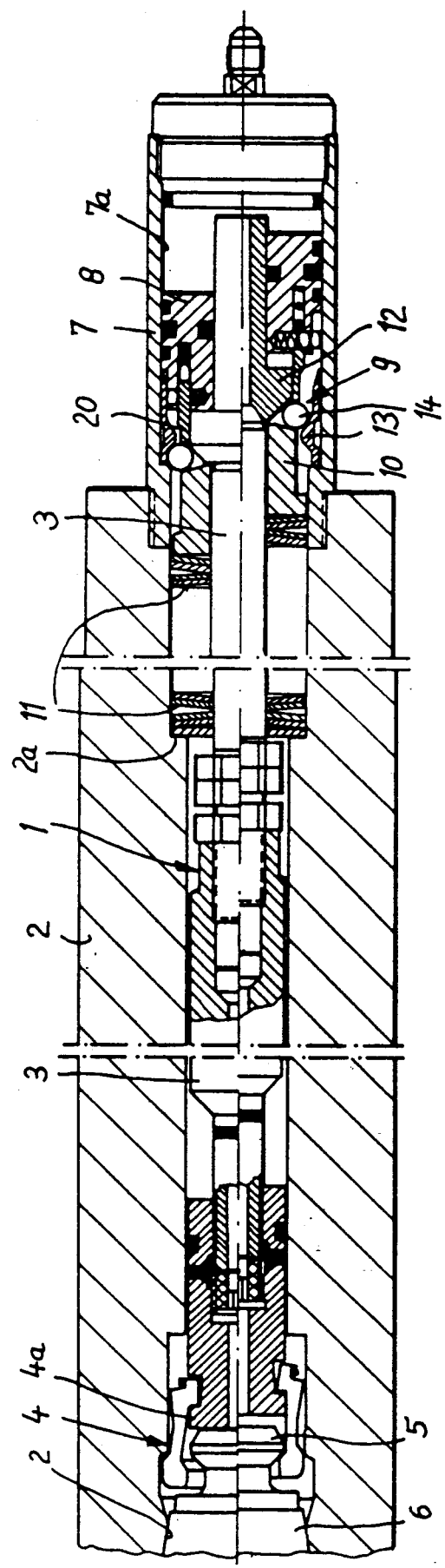
FIG. 1 is a view in longitudinal section of a complete tool clamping device.

Shown in FIG. 1 is a complete tool clamping device 1 which is fitted into a machine tool spindle 2. The tool clamping device 1 is shown in its release position in the upper half of FIG. 1 and in its clamping position in the lower half. The clamping bar 3 is axially displaceable in the direction of its axis A relative to the spindle 2 and at its end towards the tool carries a collet 4 which for example engages the draw-in post portion 5 of a tool with a steep-angle taper shank 6. The arrangement also includes a cylinder housing 7 which can be fixedly screwed into the spindle 2 and which contains a hydraulic piston-cylinder unit with a piston 8 slidable in a cylinder 7a. Also arranged in the cylinder housing 7 is a wedge transmission assembly 9, the structure and mode of operation of which will be described in greater detail hereinafter. The clamping bar 3 is also surrounded by a spring arrangement 11 comprising a plurality of plate springs. The spring arrangement 11 is supported at one end against a shoulder 2a on the spindle 2 and at the other end against a clamping sleeve 10 which is axially displaceable on the clamping bar 3. Fixedly connected to the drawbar 3 is a clamping ring 12 which is desirably in one piece with the drawbar 3. A support ring 13 which is fixedly fitted into the cylinder housing 7 bears against an annular shoulder 7b of the cylinder housing 7. The wedge transmission assembly 9 has a plurality of freely movable balls 14 which respectively bear against three cone surfaces. A first cone surface 15 is provided on the clamping sleeve 10. The second cone surface 16 is disposed on the clamping ring 12. The support ring 13 has the third cone surface 17. A fourth cone surface 18 is provided on the support ring 13 in a region thereof which is between the third cone surface 17 and the spring arrangement 11. The fourth cone surface 18 is inclined relative to the axis A of the clamping bar in opposite relationship to the third cone surface and expands towards the spring arrangement 11.

The second cone surface 16 and the third cone surface 17 are inclined relative to each other in such a way that a self-locking action occurs upon movement of the clamping bar 3 in opposite relationship to the clamping direction S between said cone surfaces 16, 17 and the balls 14 disposed therebetween. In the illustrated embodiments the second cone surface 16 is inclined at an angle of inclination $\delta$ of about 45° and the third cone surface 17 is inclined at an angle of inclination $\beta$ of about 30°, relative to the axis A of the clamping bar. The angle of inclination $\beta$ of the third cone surface relative to the axis A of the clamping bar is smaller than the angle of inclination $\alpha$ of the fourth cone surface 18 relative to the axis A of the clamping bar. The first cone surface 15 and the fourth cone surface 18 should be inclined relative to each other in such a way that, in the clamping stroke movement of the clamping sleeve 10 in the direction S there is no self-locking effect between the cone surfaces 15, 18 and the balls 14 disposed therebetween. In the illustrated embodiments the angle of inclination $\gamma$ of the first cone surface 15 relative to the axis A of the clamping bar is about 75° while the fourth cone surface 18 includes an angle of inclination $\alpha$ of about 45° with the axis A of the clamping bar.

In addition the angle of inclination $\beta$ of the third cone surface 17 relative to the axis A of the clamping bar should decrease in a direction towards the spring arrangement in the region of the narrowest location 13a of the support ring 13, and that is achieved by a roundedoff configuration between the two cone surfaces 17 and 18. The reduction in the angle $\beta$ towards the narrowest location 13a provides that in that region the self-locking effect between the second cone surface 16 and the third cone surface 17, and the balls 14 therebetween, is eliminated.

In order to provide a clamping stroke movement which is independent of the diameter of the balls 14, it is desirable for the outside diameter D of the clamping ring to be less than the inside diameter D1 of the support ring 13 at the radially narrowest location thereof. Consequently, as shown in the Lower half of FIG. 2, the clamping ring 12 can pass axially through the support ring 13 in the release stroke movement.

Figure 4:
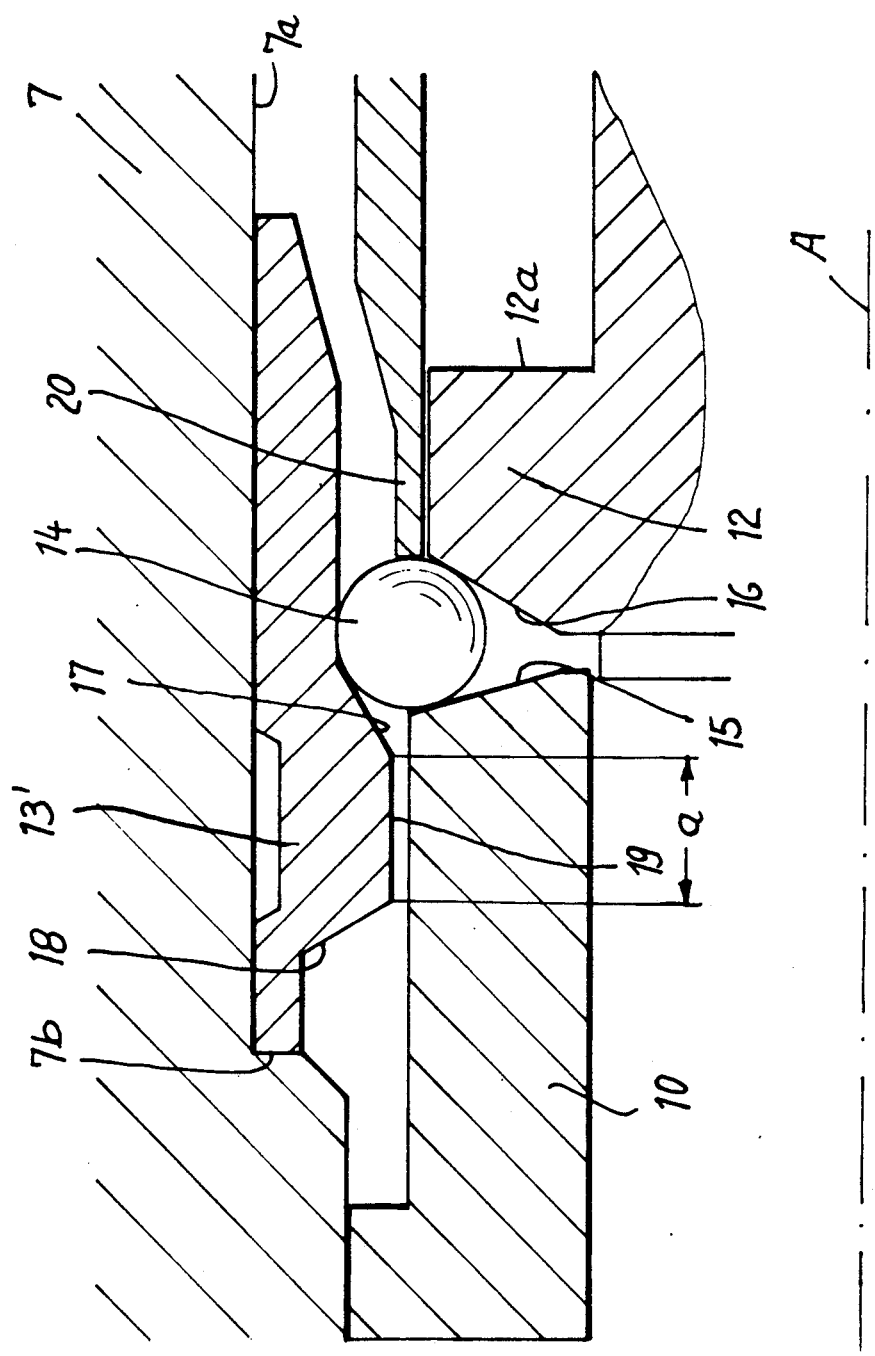
FIG. 4 is a view in longitudinal section of part of a second embodiment.

By virtue of the configuration shown in FIG. 4, the clamping stroke movement of the clamping bar 3 can be of any desired magnitude. In that embodiment the support ring 13', between the third cone surface 17 and the fourth cone surface 18, has a cylindrical surface 19, the axis of which coincides with the axis A of the clamping bar. By increasing the axial length a of the cylindrical surface 19, it is possible correspondingly to increase the length of the clamping stroke movement of the drawbar 3.

As a self-locking effect occurs between the cone surfaces 16, 17 and the balls 14 therebetween upon movement of the clamping bar 3 in opposite relationship to the clamping direction S, the clamping bar 3, with its clamping ring 12, could not be displaced towards the left in opposite relationship to the clamping direction S, in the release stroke movement. For that reason, a release ring 20 is required in the region of the balls 14. As illustrated in FIGS. 2, 5, 6 and 7 and as will also be described in greater detail hereinafter, the release ring 20 is releasably connected to the piston 8 by way of a locking means 21, 22, 23 and 24 which acts in dependence on the travel distance. The respective locking means each act in such a way that in a first phase of the release stroke movement of the piston 8 is axially locked to the release ring 20 in such a way as to be resistant to a thrust force, and that locking action is released in dependence on the travel movement just before, in the release stroke movement, the balls 14 have reached the radially narrowest location 17a of the third cone surface 17.

Before now describing in greater detail the various locking means 21, 22, 23 and 24 shown in FIGS. 2, 5, 6 and 7, the general mode of operation of the actuating arrangement will first be described, with reference to FIGS. 1 to 3.

Figure 2:
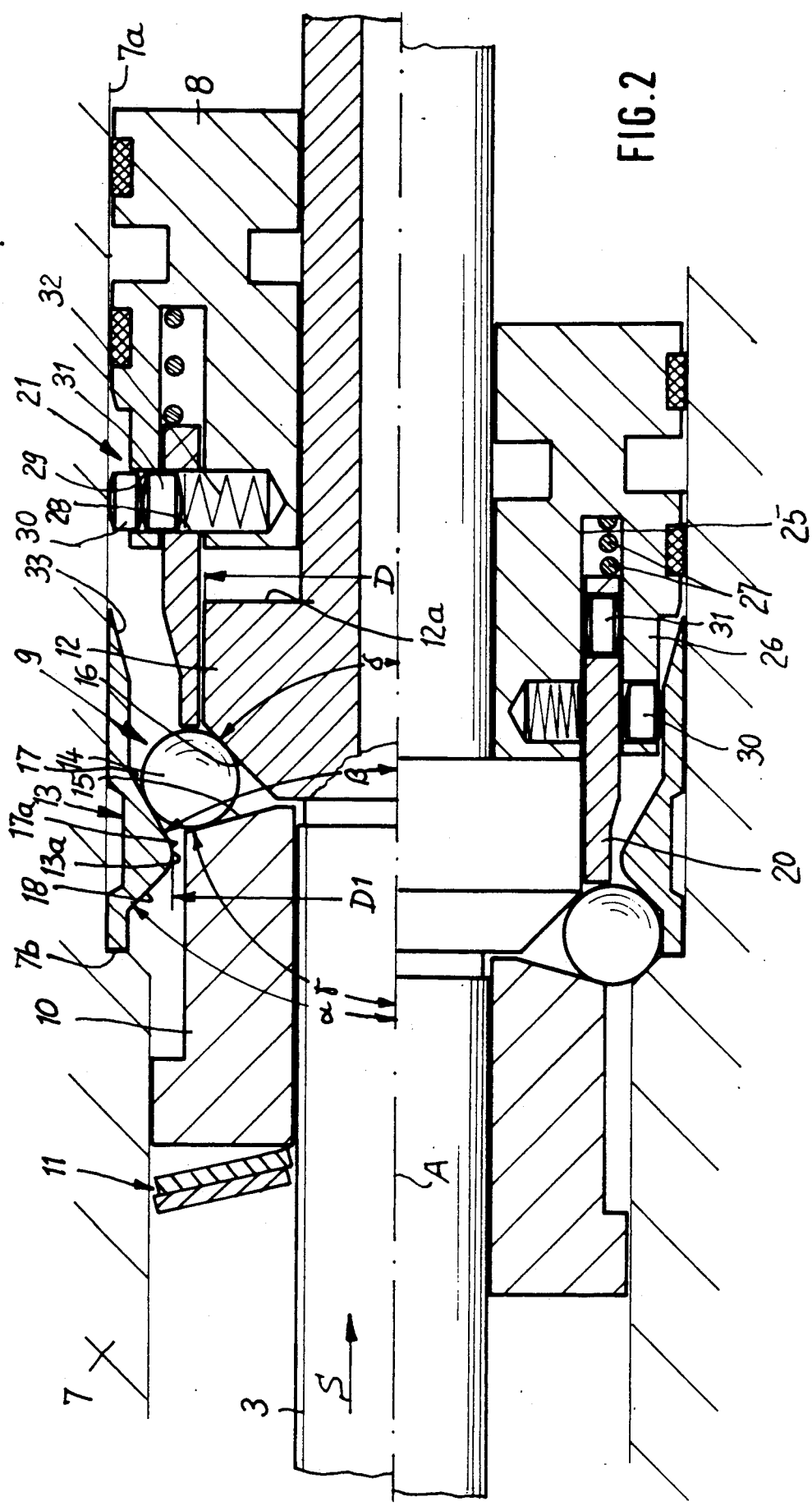
FIG. 2 is a view in longitudinal section of part of a first embodiment of the actuating arrangement, showing the end of the clamping stroke movement at the top and the end of the release stroke movement at the bottom.
Figure 3:
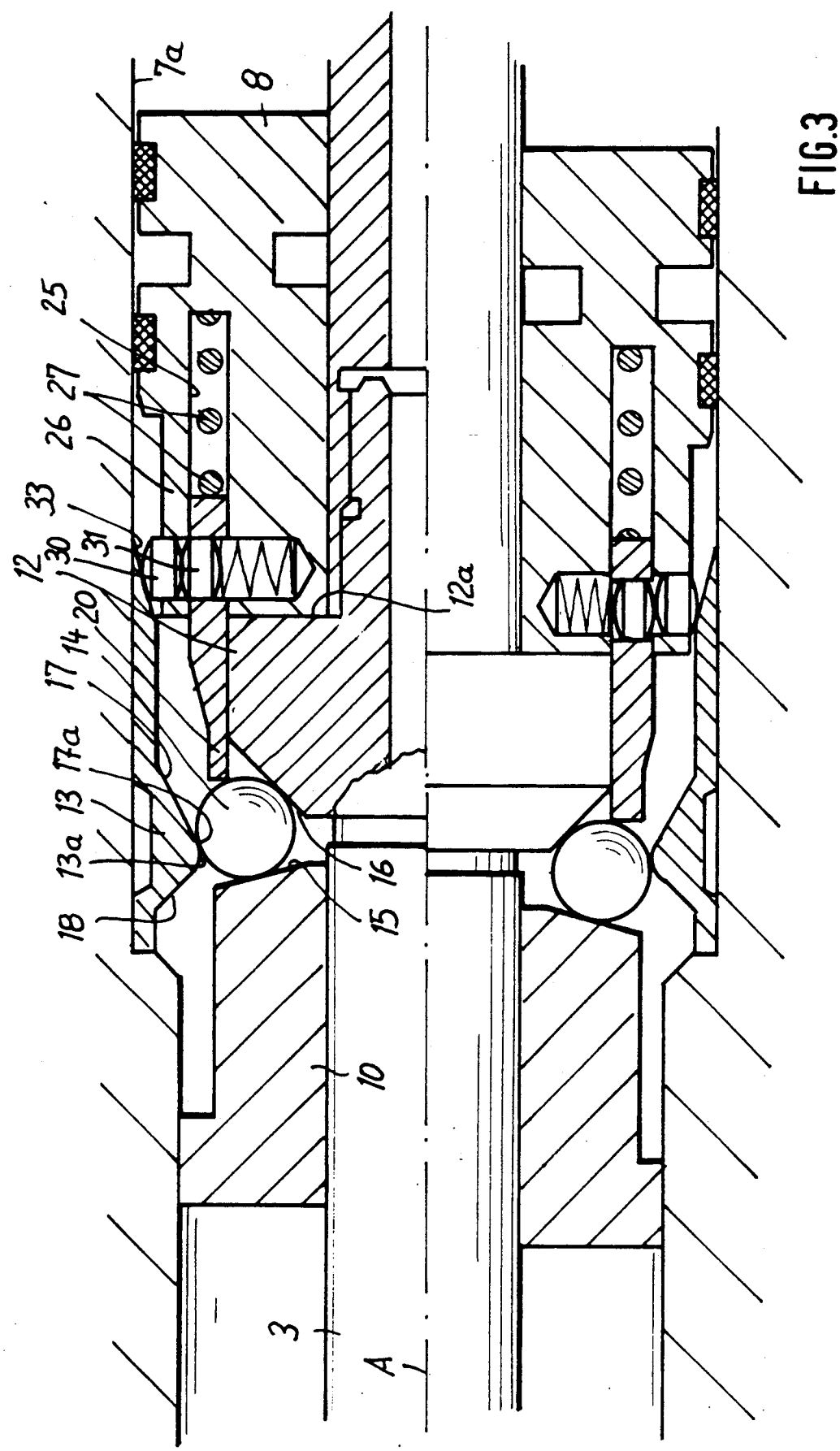
FIG. 3 shows two different intermediate positions of the actuating arrangement illustrated in FIG. 2, during the release stroke movement.

At the end of the release stroke movement of the actuating arrangement and the ejection stroke movement of the clamping bar 3, the components are in the position shown in the lower half of FIG. 2 and the upper half of FIG. 1. In order for the tool to be drawn into the spindle 2, the pressure obtaining in the cylinder 7a is removed. The clamping sleeve 10 is displaced towards the right in the clamping direction S under the force of the spring arrangement 11. Due to the fourth cone surface 18 on the support ring 13, when the clamping sleeve 10 moves towards the right the balls are urged radially inwardly and press against the first cone surface on the clamping ring 12. That provides a travel step-up effect in such a way that the clamping ring 12 is displaced towards the right by a greater distance than the clamping sleeve 10, whereby the axial spacing between the clamping sleeve 10 and the clamping ring 12 is increased. That mode of operation gives the advantage that, in the first phase of the operation of drawing in the tool, in which only very low forces are required, the desired long draw-in movement of the clamping bar 3 is achieved with a slight spring travel. As a result of the shorter spring travel, the axial length of the spring arrangement 11 can be reduced to about half in comparison with known tool clamping devices.

As soon as the balls 14 have reached the narrowest location 13a of the support ring 13, there is no longer any travel step-up effect. The clamping sleeve 10 and the clamping ring 12 are jointly displaced towards the right over distances of the same length, over a length corresponding to the axial length of the narrowest location 13a. In the embodiment shown in FIG. 4 that travel corresponds to the axial length a of the cylindrical surface 19. With the length a of that cylindrical surface 19, it is possible to provide even long clamping stroke movements of the clamping bar 3, without altering the step-up ratios and without altering the diameters of the balls 14. When the balls are urged towards the right to such an extent that they bear against the third cone surface 17, a force step-up effect takes place. The balls 14 are urged by the cone surface 15 on the clamping sleeve 10 into the annular gap, which decreases towards the piston 8, between the cone surfaces 16 and 17. The tool shank is now drawn into the receiving cone portion 2b of the spindle with a clamping force which is a multiple of the force of the spring arrangement 11. At the end of the clamping stroke movement the components occupy the position shown in the upper half of FIG. 2 and the lower half of FIG. 1. As a result of the self-locking effect between the cone surfaces 16, 17 and the balls 14 therebetween, the tool cannot be pulled out of the receiving cone portion 2b, in opposite relationship to the clamping direction S, even when subjected to forces which attain a multiple of the clamping force.

For changing the tool pressure is applied to the cylinder 7a, and the piston 8 is urged towards the left under that pressure. The release ring 20 is connected to the piston 8 by way of the locking means 21 in such a way as to be resistant to a thrust force, and comes to bear against the balls 14. The release ring 20 urges the balls 14 towards the left and therefore also pushes the clamping sleeve 10 towards the left, whereby the spring arrangement is stressed. Before now the further release stroke movement is described, the locking means 21 will first be discussed.

The release ring 20 is axially displaceable in an axially directed annular groove 25 in an axial extension 26 of the piston, in opposition to the force of a spring disposed in the annular groove 25. Provided in the release ring 20 are a plurality of radial bores 28 which in the locking position of the release ring 20 and the piston extension 26, are aligned with radial bores 29 in the extension 26. A control pin 30 is arranged in each radial bore 29 in the piston extension 26 and a locking pin 31 is arranged in each radial bore 28 in the release ring 20. The locking pin 31 is urged radially outwardly by a compression spring 32. As a result the locking pin 31 in the locking position engages partially into the radial bore 29 in the piston extension 26. The release ring 20 and the piston extension 26 are connected together in such a way as to be thrust-resistant, by way of the locking pins 31. The control pins 30 bear against a wall of the cylinder 7a during a first phase of the release stroke movement. A conical control surface 33 is also provided on the support ring 13.

In the first phase of the release stroke movement of the piston 8, which is directed towards the left, the release ring 20 is fixedly locked to the piston extension 26 by the locking pins 31. Therefore during the first phase of the release stroke movement the piston force acts solely on the release ring 20 which pushes the balls 14 along in front of it. The piston 8 moves towards the clamping ring 12 and finally comes to bear against the annular shoulder 12a thereof. Now, during the second phase of the release stroke movement the release ring 20 by way of which the major part of the piston force goes as well as the clamping bar 3 are each displaced towards the left by the same distance. At the end of the second phase of the release stroke movement, just before the balls 14 have reached the narrowest location 13a of the support ring 13, the balls 14 pass into the rounded off-region 17a of the cone surface 17. There is no longer any self-locking effect in that region. At that time the cone surface 16 also comes to tear again against the balls 14 and the force step-up effect in respect of the piston force changes from the release ring 20 to the clamping ring 12. In that way the locking means 21 is relieved of load. The end of the second phase of the release stroke movement is shown in the upper part of FIG. 3. In that phase the control pins 30 are urged radially inwardly by the control surface 33 and thereby urge the locking pins 31 out of the radial bores 29 in the piston extension 26. The locking effect between the release ring 20 and the piston extension 26 is thereby released. When the balls 14 have passed the narrowest location 13a of the support ring, they come to bear against the fourth cone surface 18. The balls 14 are urged by the cone surface 16 of the clamping ring 12 into the annular gap between the cone surfaces 18 and 15, which decreases in a tapering configuration. A force-increasing effect occurs and the clamping sleeve 10 is now urged further towards the left in opposition to the spring arrangement 11, under the effect of the increased force. That is shown in the lower part of FIG. 3. As a result of the force-increasing effect, only a small proportion of the piston force is still required for prestressing of the spring arrangement 11. Therefore almost the entire piston force is available for ejection of the tool. That piston force is applied by way of the annular shoulder 12a to the clamping bar 3 and the collet holder 4a which, as shown in the upper part of FIG. 1, is now in a position of bearing against the draw-in post portion 5, urges the tool out of the receiving cone portion 2b with a high level of ejection force. During that last phase of the release stroke movement the balls 14 move radially outwardly on the cone surfaces 16 and 18. In doing so they urge the unlocked release ring 20 in opposition to the force of the spring 27 into the annular groove 25 in the piston extension 26. When in the subsequent clamping stroke movement the pressure in the cylinder 7a is eliminated, the spring 27 then urges the piston 8 progressively towards the right so that upon further movement of the components towards the right, the locking pins 31 pass into the radial bores 29 in the piston extension 26 again and thus restore the locking action, which is required to produce the release effect, between the release ring 20 and the piston extension 26.

Figure 5:
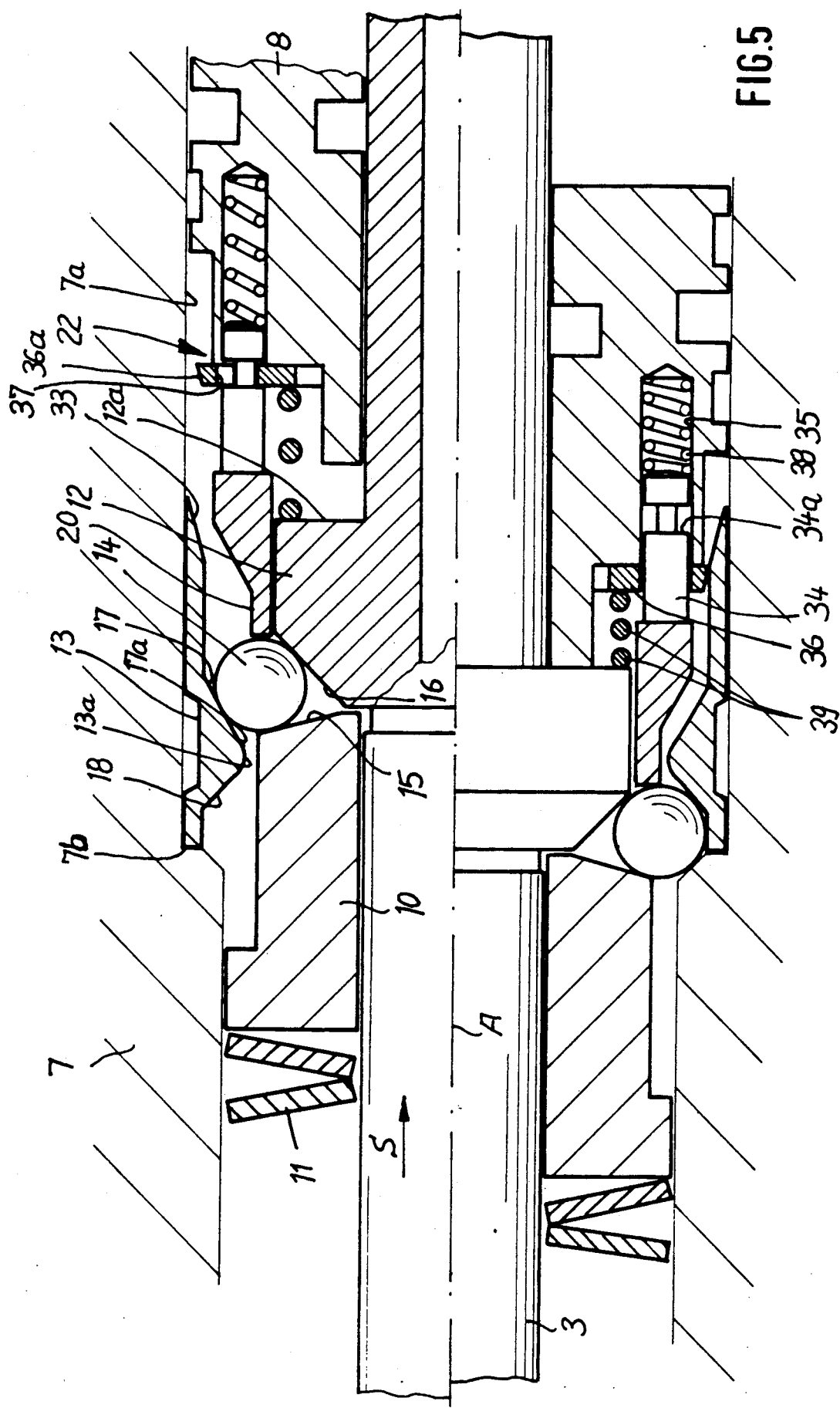
FIG. 5 is a view in longitudinal section of part of a third embodiment of the actuating arrangement, at the end of the clamping stroke movement at the top and the end of the release stroke movement at the bottom.
Figure 6:
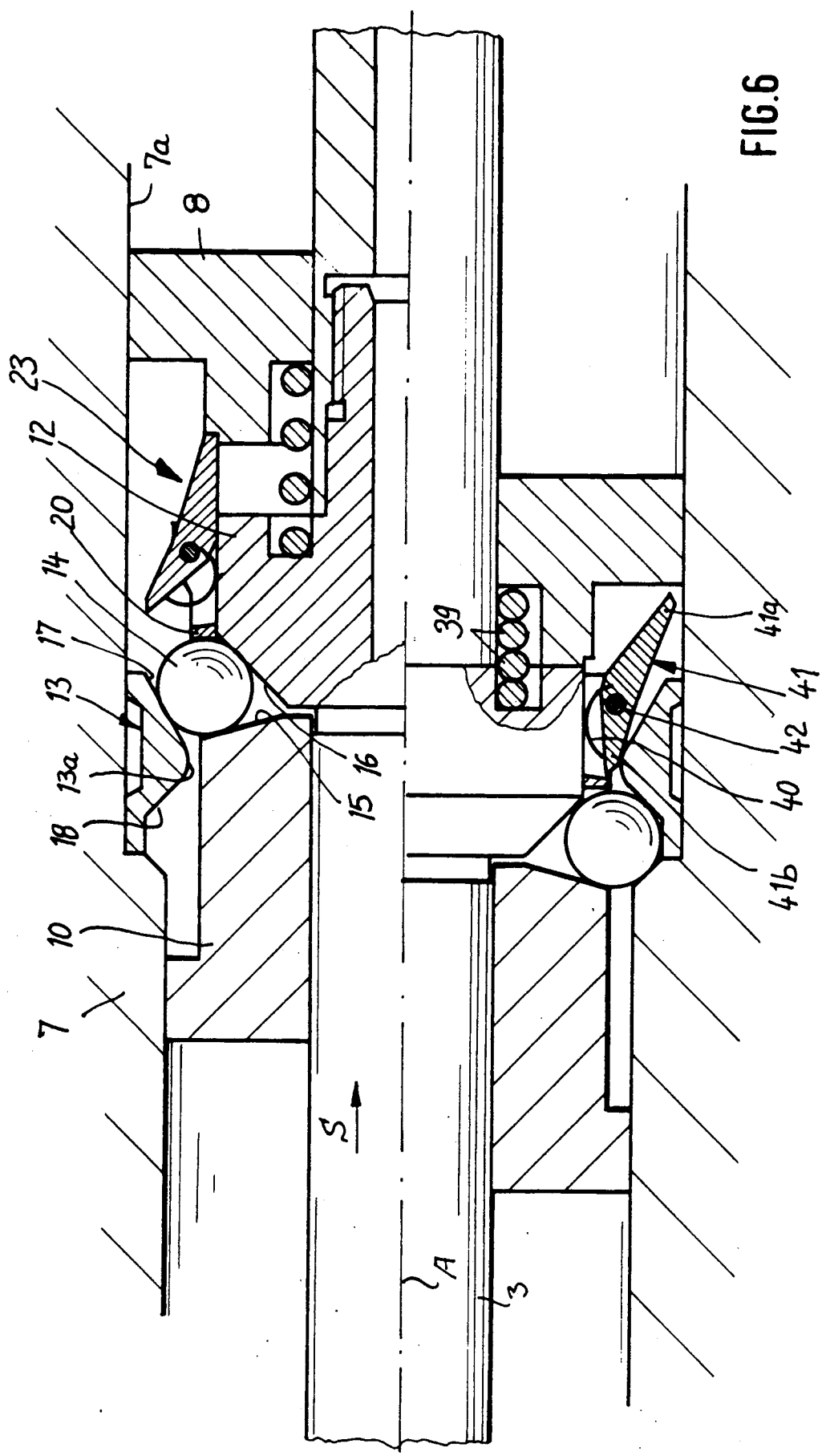
FIG. 6 is a view in longitudinal section of part of a fourth embodiment of the actuating arrangement, at the end of the clamping stroke movement at the top and the end of the release stroke movement at the bottom.
Figure 7:
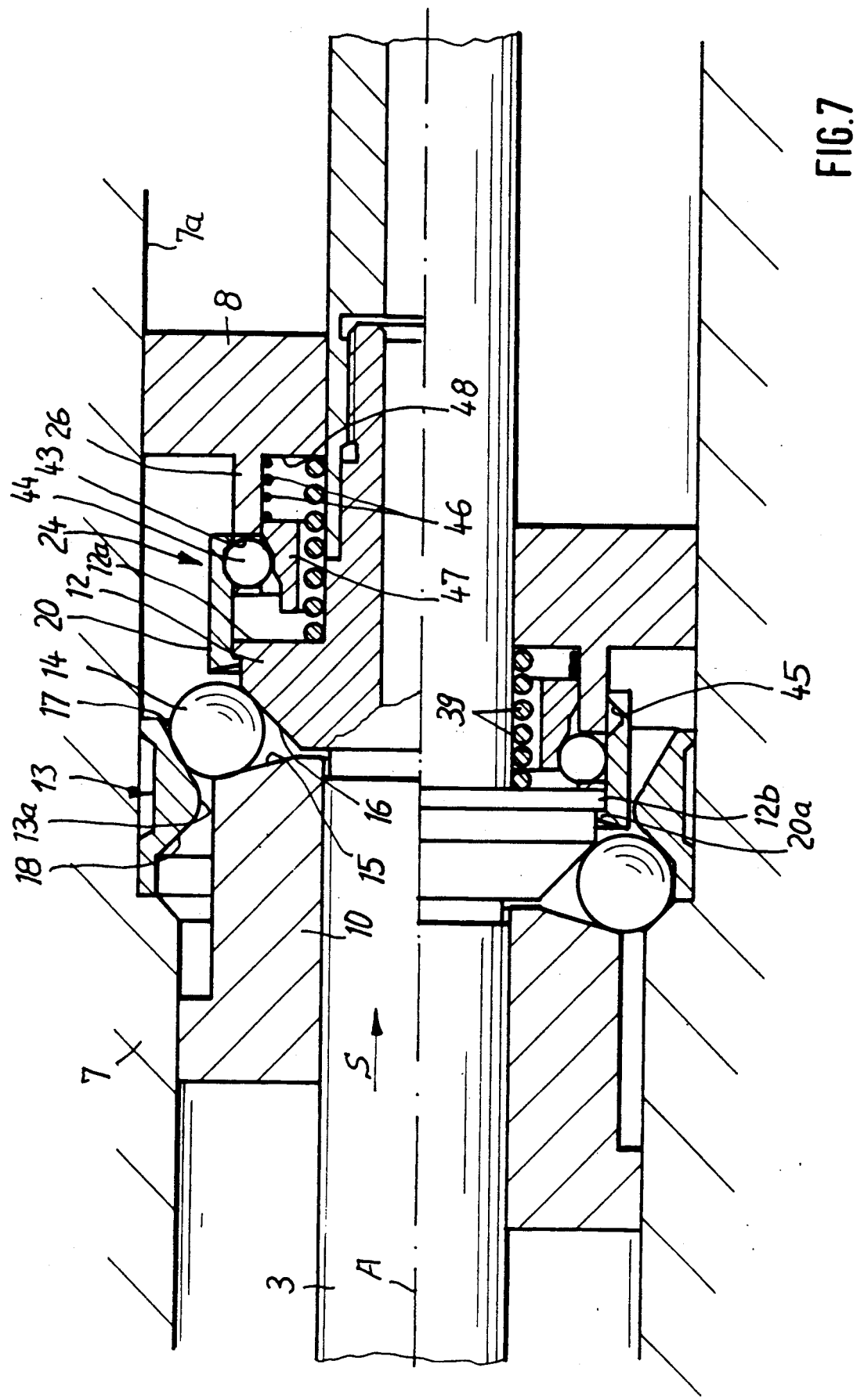
FIG. 7 is a view in longitudinal section of part of a fifth embodiment of the actuating arrangement, at the end of the clamping stroke movement at the top and the end of the release stroke movement at the bottom.

The embodiments of the actuating arrangement shown in FIGS. 5 to 7 differ from the above-described embodiment only by virtue of the locking means 22, 23 and 24 being of different configurations. The foregoing description of the mode of operation of the actuating arrangement shown in FIGS. 1 to 3 therefore also applies in corresponding fashion to the embodiments shown in FIGS. 5 to 7. For that reason components which involve the same function are identified by the same reference numerals.

In the embodiment shown in FIG. 5, at its side towards the piston 8 the release ring has a plurality of guide pins 34 which extend in parallel relationship to the axis and which are displaceably guided in guide bores 35 extending in parallel relationship to the axis in the piston extension 26. Each of the guide pins 34 is provided with an annular groove 34a. Arranged at the face of the piston extension 26 which is towards the release ring is a slit, radially outwardly resilient locking ring 36. In the region of each guide pin 34 the locking ring 36 has a through bore 37 through which the respective guide pin extends. In addition, at its outside periphery the locking ring 36 has a control edge 36a which co-operates with the control surface 34 on the support ring 13. Compression springs 38 are also provided in the bores 35. A compression spring 39 is also arranged between the piston extension and the clamping ring 12.

At the beginning of the release stroke movement of the piston 8, which is directed towards the left, the release ring 20 is connected in a thrust-resistant manner by way of the locking means 22. The slit locking ring 36 is urged radially outwardly by virtue of its prestressing and engages into the axial grooves 34a in the guide pins 34. When the piston 8 moves towards the left the control edge 36a also passes into the region of the control surface 33 whereby the spring ring 36 is urged radially inwardly against its radial prestressing. In that way the locking ring 36 is urged out of the annular grooves 34a. As soon as its through bores 37 are aligned with the guide bores 35, the locking effect is removed and the release ring 20 can now be displaced towards the piston extension 26 in opposition to the force of the small compression springs 38. The compression spring 39 which bears against the piston extension 26 pushes the clamping ring 12 towards the left so that its cone surface 16 remains in constant contact with the balls 14, without however applying any substantial force thereto. The small compression springs 38 ensure that, during the clamping stroke movement, the release ring 20 moves back into its locking position in which the locking ring 36 again engages into the annular grooves 34a in the guide pins 34.

In the embodiment shown in FIG. 6, a plurality of axially directed double-armed locking pawls 41 which are loaded by leaf springs 40 are mounted pivotably about axes 42 on the release ring 20 in axial slots therein. The one arm 41a of each locking pawl 41 serves for locking the release ring 20 with respect to the piston 8 while the other arm 41b co-operates with a control surface. In this embodiment that control surface is formed by the third cone surface 17 of the support ring 13. In the locking position the locking pawls 41 are supported with their arms 41a against the piston 8 whereby the latter is thrust-resistantly connected to the release ring 20. The compression spring 39 performs the same function as in the preceding embodiment. It holds the clamping ring 12 in constant contact with the balls 14 without however applying a substantial force to the latter. As soon as the balls 14 pass into the vicinity of the narrowest location 13a of the support ring 13, the arms 41b come to bear against the cone surface 17 whereby they are urged radially inwardly and as a result the arms 41 are pivoted radially outwardly, whereby the locking action is released. The leaf springs 40 ensure that during the clamping stroke movement the locking pawls are pivoted back into their locking position again. During the clamping stroke movement the compression spring 39 ensures that the piston moves away from the clamping ring 12 again and thus the locking pawls 41 can move back into their locking position.

In the embodiment shown in FIG. 7 the release ring 20 is axially displaceably mounted on an axial annular extension 26 of the piston 8. The extension 26 has a plurality of radial bores 43 with locking balls 44 disposed therein. The locking balls 44 engage into an annular groove 45 on the release ring 20 in the locking position. The assembly also includes a control ring 47 which is concentric with respect to the extension 26 and which is loaded by a weak compression spring 46. The control ring 47 firstly urges the locking balls 44 radially outwardly into the annular grooves 45 whereby the release ring 20 is connected in a thrust-resistant fashion to the piston extension 26. A compression spring 39 between the piston 8 and the clamping ring 12 performs the function described in relation to the preceding embodiments.

Upon the release stroke movement of the piston 8 towards the left the balls 14 are urged towards the left out of the self-locking condition by the release ring 20, as in the preceding embodiments. As soon as the balls 14 are just before the radially narrowest location 13a of the support ring 13, the control ring 47 bears against an annular shoulder 12a on the clamping ring 12. In the course of further movement of the assembly the control ring 47 is urged into a recess 48 in the piston 8. It thereby releases the locking balls 44 and the latter can slide radially inwardly in the radial bores 43. In that way the connection between the release ring 20 and the piston 8 is released. The piston extension 26 comes to bear against the annular shoulder 12a and then urges the clamping ring 12 and therewith the clamping bar 3 towards the left, as in the above-described embodiments.

During the clamping stroke movement the compression spring 39 urges the clamping ring 12 and the piston 8 away from each other again. In that situation the release ring 20 is held fast by a radially inwardly directed annular shoulder 20a on the release ring 20 and by an annular shoulder 12b on the clamping ring 12. As soon as the piston 8 has again reached its limit position shown in the upper part of FIG. 7, the control ring 47 urges the locking balls 44 into the annular groove 45 in the release ring 20 again and thereby restores the locking effect.

The embodiment of the locking means 24 shown in FIG. 7 could also be modified in such a way that the piston extension is disposed concentrically around the release ring 20 and the control ring is then in the form of a radially outermost ring arranged concentrically attend the piston extension 26. In that case the support ring 13 would then serve as an abutment for the control ring 47.

We claim:

1. In an actuating arrangement for a tool or workpiece clamping device in a machine tool spindle, comprising a clamping bar which is axially displaceable in the clamping direction in the spindle under the force of a spring arrangement, and a wedge transmission assembly which is operative between the spindle and the clamping bar, with freely movable balls which respectively bear against three cone surfaces of which the first cone surface is provided on a clamping sleeve which is axially displaceable in the clamping direction on the clamping bar under the force of the spring arrangement, the second cone surface is provided on a clamping ring connected to the clamping bar and the third cone surface is provided on a support ring arranged stationarily with respect to the spindle, wherein the second and third cone surfaces are inclined relative to each other in such a way that, upon movement of the clamping bar in opposition to the clamping direction, self-locking occurs between said cone surfaces and the balls disposed therebetween, and further comprising a piston-cylinder unit whose piston firstly acts on the clamping sleeve in a first phase of its release stroke movement directed oppositely to the clamping direction, and also acts on an annular shoulder on the clamping bar in a second phase, the improvement wherein a fourth cone surface is provided on the support ring in a region thereof which is between the third cone surface and the spring arrangement is a fourth cone surface, the fourth cone surface being inclined relative to the axis (A) of the clamping bar in opposite relationship to the third cone surface and expanding in a conical configuration towards the spring arrangement so that at the beginning of the clamping stroke movement produced by the spring arrangement the balls bear against the fourth cone surface and act on the clamping ring to produce a travel step-up effect, in a second phase of the clamping stroke movement they bear against the third cone surface and act on the clamping ring to produce a force-increasing effect, and in a last phase of the oppositely directed release stroke movement they again bear against the fourth cone surface and act on the clamping sleeve in the direction of the spring arrangement to produce a force-increasing effect, and wherein the piston of the piston-cylinder unit is releasably connected to a release ring which concentrically surrounds the clamping ring and which is provided in the region of the balls, by way of a locking means which acts in dependence on travel and which during a first phase of the release stroke movement of the piston axially locks same to the release ring in a thrust-resistant fashion and releases said locking action in dependence on travel movement just before the balls have reached the radially narrowest location of the third cone surface and at that time the piston or an extension thereof bears against the annular shoulder on the clamping bar.

2. The actuating arrangement according to claim 1, wherein the angle of inclination ($\beta$) of the third cone surface with respect to the axis (A) of the clamping bar is smaller than the angle of inclination ($\alpha$) of the fourth cone surface relative to the axis (A) of the clamping bar.

3. The actuating arrangement according to claim 1, wherein the first and fourth cone surfaces are inclined relative to each other in such a way that no self-locking action occurs between said cone surface and the balls disposed therebetween, in the clamping stroke movement of the clamping sleeve.

4. The actuating arrangement according to claim 1, wherein the angle of inclination ($\beta$) of the third cone surface with respect to the axis (A) of the clamping bar decreases towards the spring arrangement in the region of the radially narrowest location of the support ring so that in that region the self-locking action between the second and third cone surfaces and the balls disposed therebetween is eliminated.

5. The actuating arrangement according to claim 1, wherein the support ring is provided between the third and fourth cone surfaces with a cylindrical surface, the axis of which coincides with the axis (A) of the clamping bar.

6. The actuating arrangement according to claim 1, wherein the outside diameter (D) of the clamping ring is smaller than the inside diameter of the support ring at the radially narrowest location.

7. The actuating arrangement according to claim 6, wherein the clamping ring is in one piece with the clamping bar.

8. The actuating arrangement according to claim 1 wherein the locking means is unlocked by way of a control surface provided on the support ring.

9. The actuating arrangement according to claim 8, wherein the control surface is formed by the third cone surface.

10. The actuating arrangement according to claim 1, wherein the release ring is axially displaceable against the force of a spring in an axially directed annular groove in an axial extension of the piston and wherein in the release ring and in the piston extension there are provided a plurality of radial bores which are respectively aligned with each other in the locking position of the two components, wherein a control pin is disposed in each radial bore in the piston extension and a locking pin which is urged radially outwardly by a compression spring is disposed in each radial bore in the release ring, the locking pin partially engaging into the radial bore in the piston extension in the locking position.

11. The actuating arrangement according to claim 10, wherein the spring is arranged in the annular groove.

12. The actuating arrangement according to claim 1, wherein at its side towards the piston the release ring has a plurality of guide pins which are in parallel relationship with the axis and which are displaceably guided in guide bores extending in parallel relationship to the axis in a piston extension, wherein each guide pin has an annular groove, wherein arranged at the end of the piston extension which is towards the release ring is a slit, radially outwardly springing lock ring which is the region of each guide pin has a through bore through which the respective guide pin extends, and wherein at its outer periphery the locking ring has a control edge co-operating with the control surface in such a way that for locking of the release ring with respect to the piston the locking ring can be engaged by its radial prestressing into the annular grooves in the guide pins.

13. The actuating arrangement according to claim 1, wherein at least one axially operative compression spring is provided between the piston and the release ring.

14. The actuating arrangement according to claim 1, wherein pivotably mounted on the release ring are a plurality of axially directed, spring-loaded, double-armed locking pawls of which one arm bears against an axial extension of the piston for locking of the release ring with respect to the piston while the other arm thereof co-operates with the control surface.

15. The actuating arrangement according to claim 1 wherein the release ring is axially displaceably mounted on an axial, annular extension of the piston wherein provided in the extension are a plurality of radial bores with locking balls which are arranged therein and which in the locking position of the release ring and the piston engage into an annular groove in the release ring, and wherein there is provided a spring-loaded control ring which is concentric with respect to the extension and which urges the locking balls into the annular groove in the locking position and releases them for radial movement when the control ring bears against an abutment after a part of the release stroke movement of the piston.

16. The actuating arrangement according to claim 15, wherein the abutment is formed by an annular shoulder on the clamping bar or the clamping ring.

17. An actuating arrangement according to claim 1, wherein a compression spring is disposed between the piston or the piston extension and the clamping ring.

* * * * *